US006885976B2

(12) United States Patent
Yoshiki et al.

(10) Patent No.: US 6,885,976 B2
(45) Date of Patent: Apr. 26, 2005

(54) FAULT DETERMINING APPARATUS, FAULT DETERMINING METHOD AND ENGINE CONTROL UNIT FOR VARIABLE VALVE TIMING MECHANISM

(75) Inventors: Koichi Yoshiki, Saitama-ken (JP); Yukio Miyashita, Saitama-ken (JP); Hideyuki Oki, Saitama-ken (JP); Takashi Isobe, Saitama-ken (JP); Tetsuya Ohno, Saitama-ken (JP); Kojiro Tsutsumi, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 3 days.

(21) Appl. No.: 10/173,592

(22) Filed: Jun. 19, 2002

(65) Prior Publication Data

US 2002/0198683 A1 Dec. 26, 2002

(30) Foreign Application Priority Data

Jun. 21, 2001 (JP) ........................................ 2001-188573

(51) Int. Cl.$^7$ ............................................. G01M 15/00
(52) U.S. Cl. ........................ 702/185; 702/136; 702/183; 73/117.3; 123/90.19; 123/90.15
(58) Field of Search ................................. 702/182–185, 702/99, 33–35, 105, 113–115, 130, 136, 150, 151, 176–178, FOR 123–FOR 125, FOR 134, FOR 135, FOR 136, FOR 142, FOR 144, FOR 155, FOR 156, FOR 158, FOR 170, FOR 171; 123/90.15–90.19, 90.27, 90.31, 90.6, 321, 322; 374/141, 142, 144; 700/275, 278, 299, 302, 306; 701/101, 102, 105, 99; 73/116, 117.3

(56) References Cited

U.S. PATENT DOCUMENTS

| 5,537,961 A | * | 7/1996 | Shigeru et al. ........... 123/90.15 |
| 5,979,378 A | * | 11/1999 | Matsuno et al. ......... 123/90.15 |
| 6,094,974 A | * | 8/2000 | Yamagishi et al. ........ 73/117.3 |
| 6,330,870 B1 | * | 12/2001 | Inoue et al. ............. 123/90.17 |

FOREIGN PATENT DOCUMENTS

JP          8-232617          9/1996

* cited by examiner

*Primary Examiner*—Hal Wachsman
(74) *Attorney, Agent, or Firm*—Westerman, Hattori, Daniels & Adrian, LLP

(57) ABSTRACT

A fault determining apparatus for a variable valve timing mechanism is provided for shortly and accurately determining a fault even at low oil temperatures. The mechanism is driven by an oil pressure to change a cam phase of an intake cam and/or an exhaust cam with respect to a crank shaft of an internal combustion engine, thereby controlling the actual cam phase to reach a target cam phase. The apparatus has a fault determining routine executed by an ECU (electric control unit) for determining that the mechanism is faulty when a cam phase difference between the target cam phase and the actual cam phase is not within a predetermined range, an oil temperature sensor for detecting the temperature of the working oil, and a correcting routine executed by the ECU for correcting the predetermined range in an increasing direction when the detected oil temperature is low.

13 Claims, 7 Drawing Sheets

F I G. 6
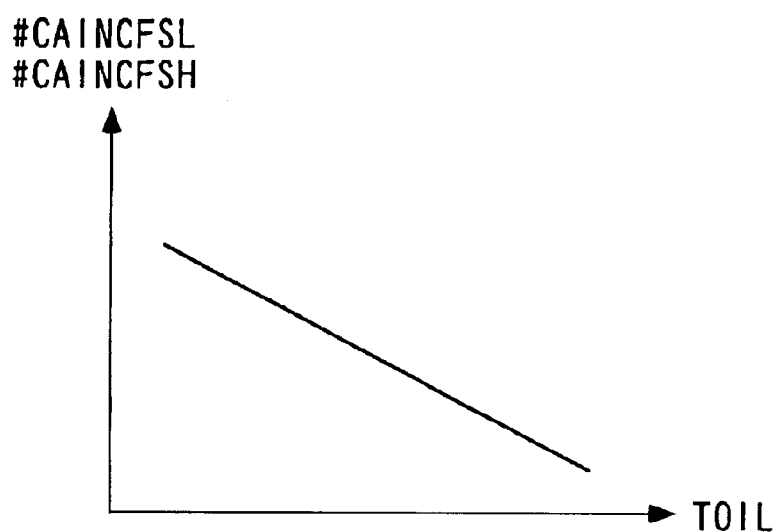
F I G. 7
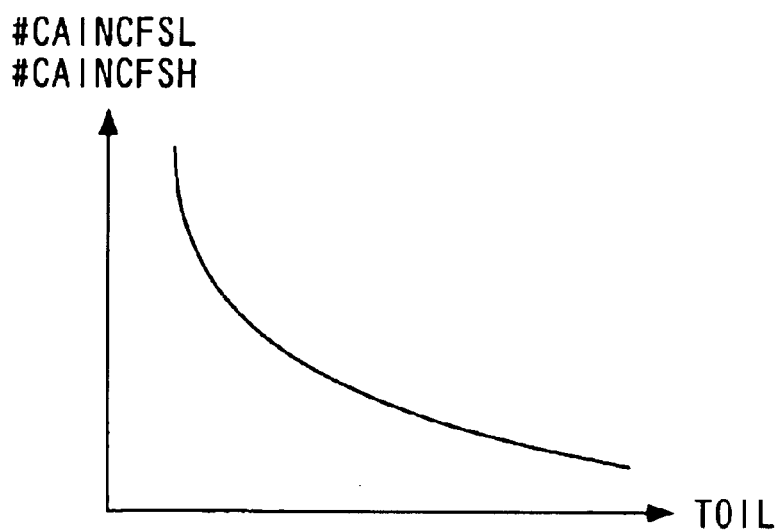

FAULT DETERMINING APPARATUS, FAULT DETERMINING METHOD AND ENGINE CONTROL UNIT FOR VARIABLE VALVE TIMING MECHANISM

BACKGROUND OF THE INVENTION

1. Field of the Invention

The present invention relates to a fault determining apparatus, a fault determining method and an engine control unit for a variable valve timing mechanism for changing an opening/closing timing of an intake valve and/or an exhaust valve by changing a cam phase of an intake cam and/or an exhaust cam with respect to a crank shaft of an internal combustion engine.

2. Description of the Prior Art

A variable valve timing mechanism is provided for improving the exhaust gas characteristic and power of an internal combustion engine by changing an opening/closing timing of intake/exhaust valves in accordance with an operating condition of the internal combustion engine to change valve overlapping and the like. A fault determining apparatus is conventionally known as well for determining a fault in the operating condition of the variable valve timing mechanism, for example, as disclosed in Laid-open Japanese Patent Application No. 8-232617. This variable valve timing mechanism is hydraulically driven by a working oil to change a relative angle of a cam shaft to a cam pulley, thereby changing a cam phase. The cam phase is controlled in a feedback manner to reach a target cam phase which has been set in accordance with an operating condition of an engine.

The aforementioned fault determining apparatus determines that the variable valve timing mechanism is faulty when an absolute value of a difference between the target cam phase and a detected actual cam phase (actual cam phase) is equal to or more than a first predetermined value, and an absolute value of a variation in the actual cam phase is equal to or less than a second predetermined value, because there is a large difference between both cam phases, and the actual cam phase does not properly follow the target cam phase in spite of the fact that the actual cam phase is not rapidly changing toward the target cam phase. The fault determining apparatus also detects the temperature of the working oil and disables a fault determination or extends a determination time when the detected temperature is not within a predetermined range, thereby preventing an erroneous determination when the variable valve timing mechanism exhibits a low responsibility due to a cold working oil and a resulting large viscosity thereof.

As described above, the conventional fault determining apparatus is configured to disable a fault determination or extend a fault determination time when the working oil is at low temperatures. For this reason, when the fault determination is disabled due to a low oil temperature, the fault determining apparatus cannot make the fault determination until the oil temperature rises to the predetermined range, thereby failing to provide a determination result. Also, when the fault determination time is extended, the fault determining apparatus takes a long time for the determination, failing to shortly provide a determination result. Particularly, since a recent tendency is such that the use of the variable valve timing mechanism is increasingly required in an oil temperature range extending to a low oil temperature region for improving the exhaust gas characteristic and product features, an appropriate fault determination becomes correspondingly important in a low oil temperature range.

OBJECT AND SUMMARY OF THE INVENTION

The present invention has been made to solve the foregoing problem, and it is an object of the invention to provide a fault determining apparatus, a fault determining method and an engine control unit for a variable valve timing mechanism which are capable of shortly and accurately making a fault determination while preventing an erroneous determination even at low oil temperatures.

To achieve the above object, according to a first aspect of the present invention, there is provided a fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of the at least one of the intake cam and the exhaust cam in a feedback manner to reach a set target cam phase.

The fault determining apparatus according to the first aspect of the present invention is characterized by comprising fault determining means for determining that the variable valve timing mechanism is faulty when a cam phase difference between the target cam phase and the actual cam phase is not within a predetermined range; oil temperature parameter detecting means for detecting an oil temperature parameter indicative of the temperature of the working oil; and correcting means for correcting the predetermined range in an increasing direction when the oil temperature parameter detected by the oil temperature parameter detecting means indicates a low oil temperature.

This fault determining apparatus for a variable valve timing mechanism determines that the variable valve timing mechanism is faulty when the cam phase difference between the target cam phase set for feedback control and the actual cam phase is not within the predetermined range, on the assumption that the actual cam phase is not tightly following the target cam phase. The fault determining apparatus also detects the oil temperature of the working oil for driving the variable valve timing mechanism, and corrects the predetermined range for the cam phase difference for determining a fault in the increasing direction when the detected oil temperature is low. As described above, since the working oil exhibits a high viscosity at low oil temperatures, the variable valve timing mechanism driven by the highly viscous working oil operates slowly with a low responsibility. For this reason, the cam phase difference tends to be larger even if the variable valve timing mechanism is normal. Therefore, according to the present invention, the predetermined range for the cam phase difference is corrected in the increasing direction at low oil temperatures to alleviate the condition for the fault determination, thereby making it possible to appropriately determine a fault and meanwhile prevent an erroneous determination, while reflecting a difference in the responsibility of the variable valve timing mechanism depending on the oil temperature. Also, unlike the prior art, the result of fault determination can be provided at an earlier time since the fault determination is not disabled at low oil temperatures, or the determination time is not extended.

To achieve the above object, according to a second aspect of the present invention, there is provided a fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of the at least one of the intake cam and the exhaust cam in a feedback manner to reach a set target cam phase.

The fault determining apparatus according to the second aspect of the present invention is characterized by comprising a fault determining module for determining that the variable valve timing mechanism is faulty when a cam phase difference between the target cam phase and the actual cam phase is not within a predetermined range; an oil temperature parameter detecting module for detecting an oil temperature parameter indicative of the temperature of the working oil; and a correcting module for correcting the predetermined range in an increasing direction when the oil temperature parameter detected by the oil temperature parameter detecting module indicates a low oil temperature.

This fault determining apparatus provides the same advantageous effects as described above concerning the fault determining apparatus according to the first aspect of the present invention.

To achieve the above object, according to a third aspect of the present invention, there is provided a fault determining method for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of the at least one of the intake cam and the exhaust cam in a feedback manner to reach a set target cam phase.

The fault determining method according to the third aspect of the present invention is characterized by comprising the steps of determining that the variable valve timing mechanism is faulty when a cam phase difference between the target cam phase and the actual cam phase is not within a predetermined range; detecting an oil temperature parameter indicative of the temperature of the working oil; and correcting the predetermined range in an increasing direction when the detected oil temperature parameter indicates a low oil temperature.

This fault determining method provides the same advantageous effects as described above concerning the fault determining apparatus according to the first aspect of the present invention.

To achieve the above object, according to a fourth aspect of the present invention, there is provided an engine control unit including a control program for causing a computer to carry out a fault determination for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of the at least one of the intake cam and the exhaust cam in a feedback manner to reach a set target cam phase.

The engine control unit according to the fourth aspect of the present invention is characterized in that the control program causes the computer to determine that the variable valve timing mechanism is faulty when a cam phase difference between the target cam phase and the actual cam phase is not within a predetermined range; detect an oil temperature parameter indicative of the temperature of the working oil; and correct the predetermined range in an increasing direction when the detected oil temperature parameter indicates a low oil temperature.

This engine control unit provides the same advantageous effects as described above concerning the fault determining apparatus according to the first aspect of the present invention.

In the fault determining apparatus for a variable valve timing mechanism, preferably, the correcting means corrects the predetermined range to expand as the oil temperature is lower.

Generally, the responsibility of the variable valve timing mechanism driven by a working oil is degraded as the oil temperature is lower. Therefore, in the foregoing preferred embodiment of the fault determining apparatus, the predetermined range for the cam phase difference can be more finely and appropriately set in accordance with the oil temperature to fit to the responsibility of the variable valve timing mechanism, thereby improving the accuracy of the fault determination.

Also, in the fault determining apparatus for a variable valve timing mechanism, preferably, the correcting module corrects the predetermined range to expand as the oil temperature is lower.

This preferred embodiment of the fault determining apparatus provides the same advantageous effects as provided by the corresponding preferred embodiment of the fault determining apparatus.

Also, in the fault determining method for a variable valve timing mechanism, preferably, the step of correcting includes correcting the predetermined range to expand as the oil temperature is lower.

This preferred embodiment of the fault determining method provides the same advantageous effects as provided by the corresponding preferred embodiment of the fault determining apparatus.

Also, in the engine control unit, preferably, the control program causes the computer to correct the predetermined range to expand as the oil temperature is lower.

This preferred embodiment of the engine control unit provides the same advantageous effects as provided by the corresponding preferred embodiment of the fault determining apparatus.

Preferably, in the fault determining apparatus for a variable valve timing mechanism, the correcting means corrects the predetermined range to expand at a higher rate in response to a larger fall in the oil temperature.

Generally, the responsibility of the variable valve timing mechanism is degraded at a higher rate as the oil temperature is lower. Therefore, according to the foregoing preferred embodiment of the fault determining apparatus, the predetermined range for the cam phase difference can be more appropriately set in accordance with the oil temperature to fit to the responsibility of the variable valve timing mechanism, thereby making it possible to further improve the accuracy of the fault determination.

Preferably, in the fault determining apparatus for a variable valve timing mechanism, the correcting module corrects the predetermined range to expand at a higher rate in response to a larger fall in the oil temperature.

This preferred embodiment of the fault determining apparatus provides the same advantageous effects as provided by the corresponding preferred embodiment of the fault determining apparatus.

Preferably, in the fault determining method for a variable valve timing mechanism, the step of correcting includes correcting the predetermined range to expand at a higher rate in response to a larger fall in the oil temperature.

This preferred embodiment of the fault determining method provides the same advantageous effects as provided by the corresponding preferred embodiment of the fault determining apparatus.

Preferably, in the engine control unit, the control program causes the computer to correct the predetermined range to expand at a higher rate in response to a larger fall in the oil temperature.

This preferred embodiment of the engine control unit provides the same advantageous effects as provided by the corresponding preferred embodiment of the fault determining apparatus.

Preferably, in the fault determining apparatus for a variable valve timing mechanism, the fault determining means is configured to preliminarily determine that the variable valve timing mechanism is faulty when the cam phase difference is not within the predetermined range, and to definitely determine that the variable valve timing mechanism is faulty when the cam phase difference again goes out of the predetermined range, wherein the fault determining apparatus further includes storing means for storing the target cam phase when the fault determining means preliminarily determines a fault as a preliminary fault determination target cam phase; and normality determining means for determining that the variable valve timing mechanism is normal when a difference between the target cam phase which is set when the cam phase difference falls under the predetermined range after the preliminary determination of the fault and the stored preliminary fault determination target cam phase is within a predetermined range, and for suspending a determination that the variable valve timing mechanism is normal when the difference is not within the predetermined range.

According to this preferred embodiment of the fault determining apparatus, the fault determining means preliminarily determines that the variable valve timing mechanism is faulty when the cam phase difference is not within the predetermined range, and definitely determines that the variable valve timing mechanism is faulty when the cam phase difference again goes out of the predetermined range. Since the faulty variable valve timing mechanism is definitely determined on condition that confirmation is made twice that the cam phase difference is out of the predetermined range, it is possible to avoid an erroneous determination which could be made when the cam phase difference temporarily goes out of the predetermined range, even though no fault is actually occurring.

Also, the normality determining means determines that the variable valve timing mechanism is normal when a difference between the target cam phase which is set when the cam phase difference falls under the predetermined range after the preliminary determination of the fault and the preliminary fault determination target cam phase is within a predetermined range, i.e., when both target cam phases are relatively close to each other, and suspends a determination that the variable valve timing mechanism is normal when the difference is not within the predetermined range, i.e., when both target cam phases are far away from each other. This determination strategy is employed for the following reason. Assuming that the variable valve timing mechanism fails, for example, due to dust clogging therein which disables the cam phase to change, i.e., a frozen cam phase, when the target cam phase is far away from the frozen cam phase, the cam phase difference goes out of the predetermined range. On the other hand, when the target cam phase is relatively close to the frozen cam phase, the cam phase difference inadvertently falls within the predetermined range, possibly resulting in an erroneous determination that the variable valve timing mechanism is normal. To prevent such an erroneous determination, according to the present invention, the variable valve timing mechanism is determined to be normal only when the preliminary fault determination target cam phase is relatively close to the target cam phase which is set when the cam phase difference subsequently falls within the predetermined range, while the determination of the variable valve timing mechanism as normal is suspended when the two target cam phases are far away from each other, thereby making it possible to avoid the erroneous determination as described above without fail.

Preferably, in the fault determining apparatus for a variable valve timing mechanism, the fault determining module is configured to preliminarily determine that the variable valve timing mechanism is faulty when the cam phase difference is not within the predetermined range, and to definitely determine that the variable valve timing mechanism is faulty when the cam phase difference again goes out of the predetermined range, wherein the fault determining apparatus further comprises a storing module for storing the target cam phase when the fault determining module preliminarily determines a fault as a preliminary fault determination target cam phase; and a normality determining module for determining that the variable valve timing mechanism is normal when a difference between the target cam phase which is set when the cam phase difference falls under the predetermined range after the preliminary determination of the fault and the stored preliminary fault determination target cam phase is within a predetermined range, and for suspending a determination that the variable valve timing mechanism is normal when the difference is not within the predetermined range.

This preferred embodiment of the fault determining apparatus provides the same advantageous effects as provided by the corresponding preferred embodiment of the fault determining apparatus.

Preferably, in the fault determining method for a variable valve timing mechanism, the step of determining that the variable valve timing mechanism is faulty includes preliminarily determining that the variable valve timing mechanism is faulty when the cam phase difference is not within the predetermined range, and definitely determining that the variable valve timing mechanism is faulty when the cam phase difference again goes out of the predetermined range, wherein the fault determining method further comprises the steps of storing the target cam phase when preliminarily determining a fault as a preliminary fault determination target cam phase; and determining that the variable valve timing mechanism is normal when a difference between the target cam phase which is set when the cam phase difference falls under the predetermined range after the preliminary determination of the fault and the stored preliminary fault determination target cam phase is within a predetermined range, and suspending a determination that the variable valve timing mechanism is normal when the difference is not within the predetermined range.

This preferred embodiment of the fault determining method provides the same advantageous effects as provided by the corresponding preferred embodiment of the fault determining apparatus.

Preferably, in the engine control unit, the control program causes the computer to preliminarily determine that the variable valve timing mechanism is faulty when the cam phase difference is not within the predetermined range, and definitely determine that the variable valve timing mechanism is faulty when the cam phase difference again goes out of the predetermined range, wherein the computer program further causes the computer to store the target cam phase when preliminarily determining a fault as a preliminary fault determination target cam phase; determine that the variable valve timing mechanism is normal when a difference between the target cam phase which is set when the cam phase difference falls under the predetermined range after the preliminary determination of the fault and the stored preliminary fault determination target cam phase is within a predetermined range; and suspend a determination that the variable valve timing mechanism is normal when the difference is not within the predetermined range.

This preferred embodiment of the engine control unit provides the same advantageous effects as provided by the corresponding preferred embodiment of the fault determining apparatus.

Also, to achieve the above object, according to a fifth aspect of the present invention, there is provided a fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of the at least one of the intake cam and the exhaust cam in a feedback manner to reach a set target cam phase.

The fault determining apparatus according to the fifth aspect of the present invention is characterized by comprising fault determining means for determining that the variable valve timing mechanism is faulty when the actual cam phase is larger than a predetermined upper limit; oil temperature parameter detecting means for detecting an oil temperature parameter indicative of the temperature of the working oil; and correcting means for correcting the upper limit value in accordance with the oil temperature parameter detected by the oil temperature parameter detecting means.

Generally, the stability in the operation of a variable valve timing mechanism driven by a working oil varies depending on the temperature of the working oil, and in particular, is lower as the oil temperature is lower. Therefore, according to the present invention, an appropriate determination can be made as to whether or not the variable valve timing mechanism is faulty by correcting an upper limit value for the actual cam phase for determining a fault in the variable valve timing mechanism in accordance with a detected oil temperature to reflect the stability in the operation of the variable valve timing mechanism. For example, the upper limit value may be corrected to be a larger value when the oil temperature is lower, thereby ensuring to avoid an erroneous determination at low oil temperatures where the variable valve timing mechanism presents an instable operation.

BRIEF DESCRIPTION OF THE DRAWINGS

FIG. 6 shows another exemplary graph, different from that of FIG. 4, for setting a delayed and an advanced predetermined value #CAINSFSL, #CAINFSH;

FIG. 7 shows another exemplary graph, different from those of FIGS. 4, 6, for setting a delayed and an advanced predetermined value #CAINSFSL, #CAINFSH.

DETAILED DESCRIPTION OF THE EMBODIMENTS

Figure 1:
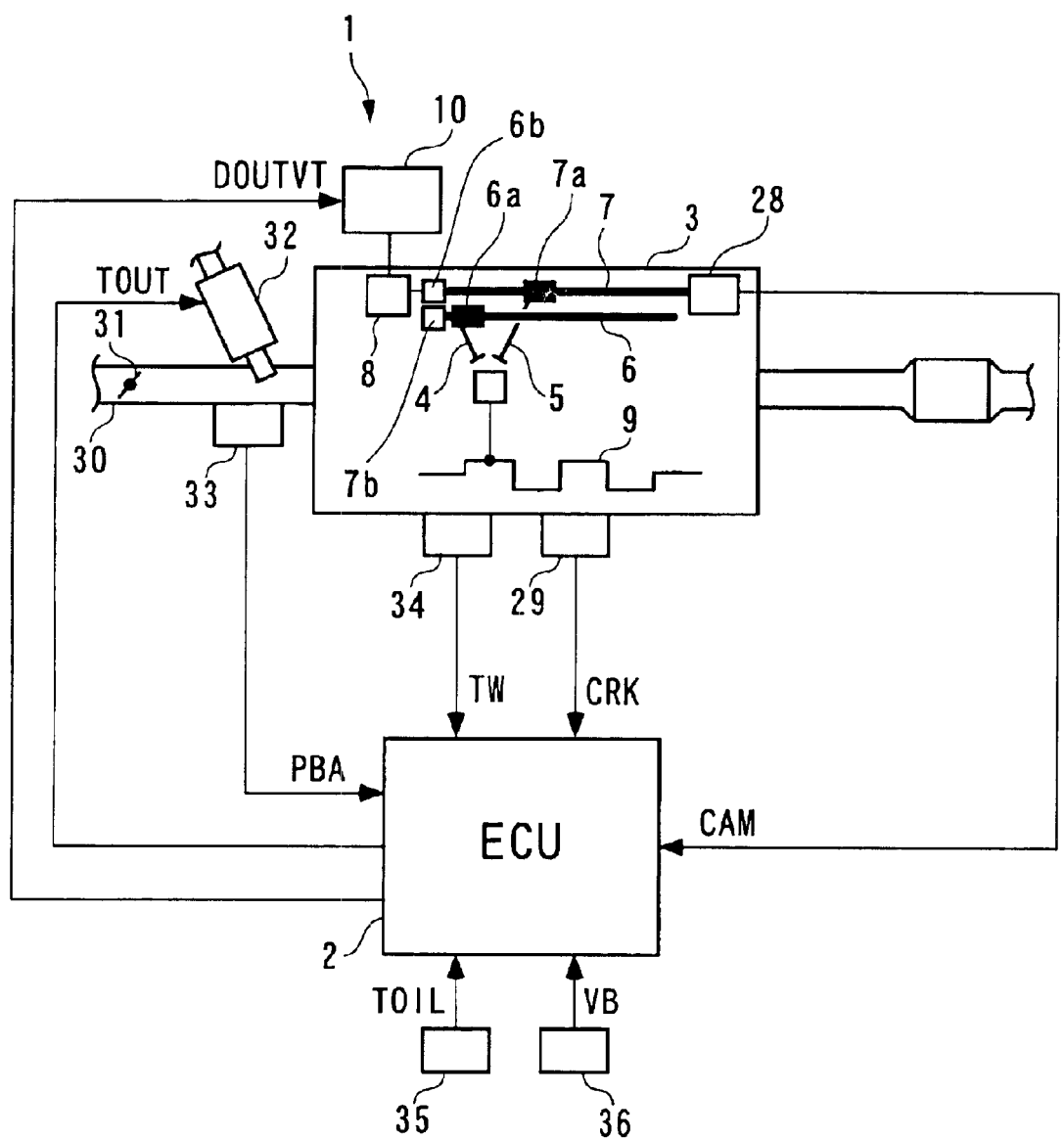
FIG. 1 is a block diagram generally illustrating the configuration of an internal combustion engine which comprises a variable valve timing mechanism to which the present invention is applied.

In the following, one embodiment of the present invention will be described with reference to the accompanying drawings. FIG. 1 generally illustrates the configuration of an internal combustion engine which comprises a variable valve timing mechanism to which the present invention is applied. The illustrated internal combustion engine (hereinafter simply called the "engine") 3, which is, for example, a four-cycle DOHC (double overhead camshaft) gasoline engine, comprises an intake cam shaft 6 and an exhaust cam shaft 7. The intake cam shaft 6 and exhaust cam shaft 7 are coupled to a crank shaft 9 through driven sprockets 6b, 7b associated therewith and a timing chain (not shown), and are driven at a rate of one rotation per two rotations of the crank shaft 9. The intake cam shaft 6 and exhaust cam shaft 7 are integrally provided with a plurality of intake cams 6a and exhaust cams 7a (only one each of which is shown) for opening and closing an intake valve 4 and an exhaust valve 5, respectively.

The intake cam shaft 6 is coupled to the driven sprocket 6b for rotation within a predetermined angle range, so that a phase CAIN of the intake cam 6a with respect to the crank shaft 9 (hereinafter simply called the "cam phase") can be changed by changing a relative angle of the intake cam shaft 6 with respect to the driven sprocket 6b. A variable valve timing mechanism (hereinafter abbreviated as the "VTC") 1 is provided at one end of the intake cam shaft 6 for changing the cam phase CAIN. The VTC 1 is comprised of a cam phase change mechanism 8 and an oil pressure control valve 10.

The cam phase change mechanism 8 rotates the intake cam shaft 6 with respect to the driven sprocket 6b to continuously change the cam phase CAIN to continuously advance or retard the opening/closing timing (valve timing) for the intake valve 6a. The cam phase change mechanism 8 has an advance chamber 11 and a retard chamber 12 (see FIG. 2) defined on one and the other sides of a vein (not shown) integrally formed with the intake cam shaft 6. As an oil pressure of a working oil from an oil pump 27 (see FIG. 2), functioning as an oil pressure source driven by the engine 3, is selectively supplied to the advance chamber 11 or retard chamber 12 through the oil pressure control valve 10, the intake cam shaft 6 is advanced or retarded.

Figure 2:
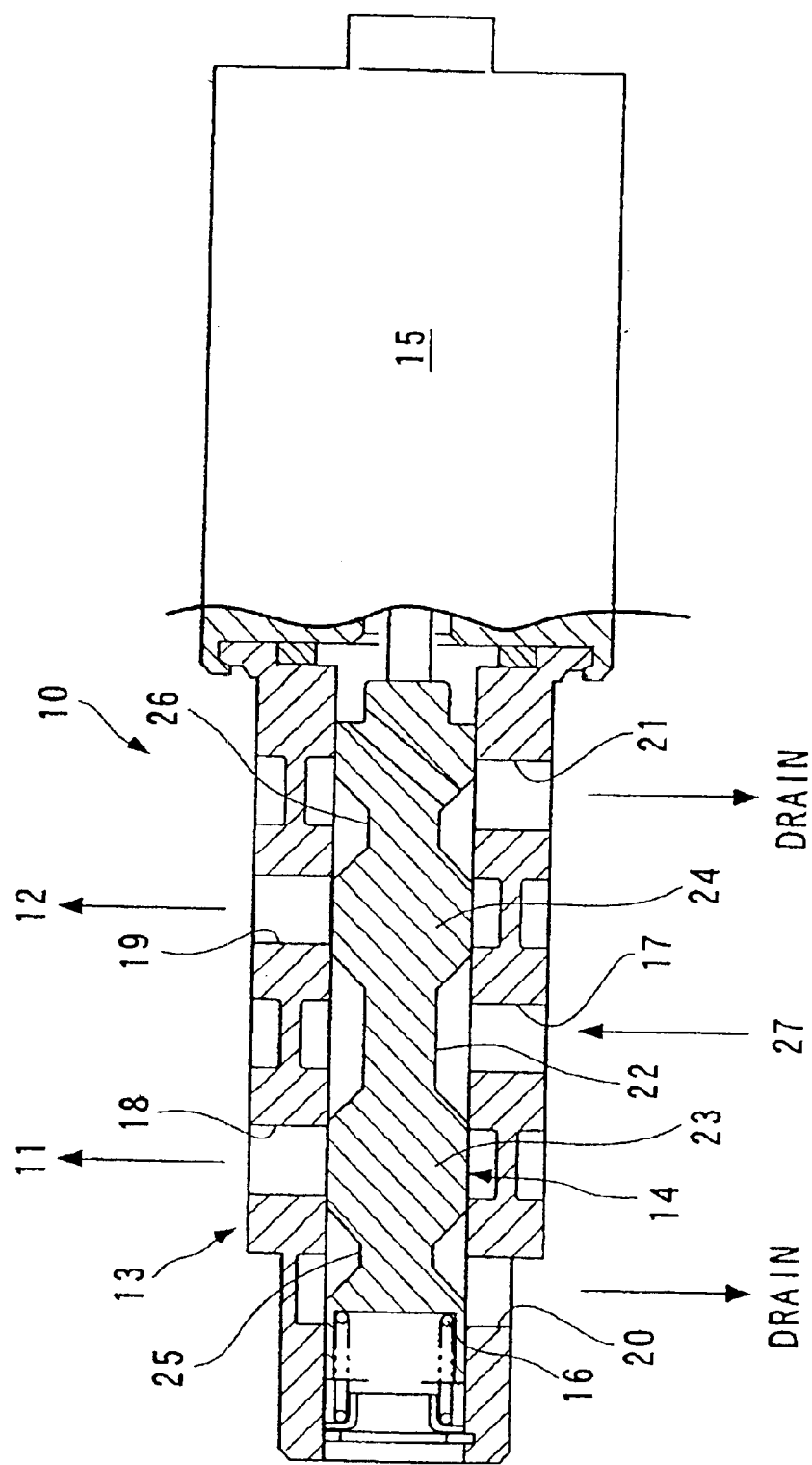
FIG. 2 is a partial vertical sectional view illustrating a hydraulic control valve in the variable valve timing mechanism in FIG. 1.

As illustrated in FIG. 2, the oil pressure control valve 10 comprises a cylindrical sleeve 13; a spool 14 slidably fitted in the sleeve 13; a duty solenoid 15 fixed to the sleeve 13 for driving the spool 14; and a spring 16 for urging the spool 14 toward the duty solenoid 15. An axial position of the spool 14 can be continuously changed by duty controlling a current supplied from a battery (not shown) to the duty solenoid 15 by a control signal from an electric control unit (ECU) 2, later described.

The sleeve 13 is formed with a central input port 17; an advance port 18 and a retard port 19 positioned on one and the other sides of the central input port 17; and a pair of drain ports 20, 21 positioned outside the advance port 18 and retard port 19, respectively. The spool 14 in turn is formed with a central groove 22; a pair of lands positioned on one and the other sides of the central groove 22; and a pair of grooves 25, 26 positioned outside the lands 23, 24. The input port 17 is connected to the oil pump 27, while the advance port 18 and retard port 19 are connected to the advance chamber 11 and retard chamber 12 of the cam phase change mechanism 8, respectively.

In the foregoing structure, when the oil pressure control valve 10 is set at a duty ratio DOUTVT of 50%, for example, the spool 14 takes a neutral position indicated in FIG. 2 to close the input port 17 between its lands 23, 24 and to close the advance port 18 and retard port 19 by the lands 23, 24. This blocks the oil pressure supplied to the advance chamber 11 and retard chamber 12, and the intake cam shaft 6 is integrated with the driven sprocket 6b to hold the cam phase CAIN.

As the duty ratio DOUTVT of the oil pressure control valve 10 is increased from 50% in the foregoing state, the spool 14 moves to the left from the neutral position against an urging force of the spring 16, causing the input port 17 to communicate with the advance port 18 through the groove 22 and the retard port 19 to communicate with the drain port 21 through the groove 26. Thus, the advance chamber 12 is supplied with the oil pressure from the oil pump 27 to rotate the intake cam shaft 6 in an advance direction with respect to the driven sprocket 6b, allowing the cam phase CAIN to continuously change in the advance direction. Similarly, as the duty ratio DOUTVT of the oil pressure control valve 10 is reduced below 50%, the spool 14 moves to the right from the neutral position, causing the input port 17 to communicate with the retard port 19 and the advance port 18 to communicate with the drain port 20. Thus, the retard chamber 13 is supplied with the oil pressure to rotate the intake cam shaft 6 in a retard direction with respect to the driven sprocket 6b, allowing the cam phase CAIN to continuously change in the retard direction.

Then, the duty ratio DOUTVT of the duty solenoid 15 is set at 50% when a target cam phase CAIN is found, and the spool 14 is fixed at the neutral position to hold the target cam phase CAIN. In the foregoing manner, the cam phase CAIN is continuously advanced or retarded by controlling the duty ratio DOUTVT of the oil pressure control valve 10 in response to the control signal from the ECU 2.

Turning back to FIG. 1, a cam angle sensor 28 is provided at the end of the intake cam shaft 6 opposite to the end at which the cam phase change mechanism 8 is provided. The cam angle sensor 28 is comprised, for example, of a magnet rotor and an MRE pickup, and outputs a pulsed CAM signal to the ECU 2 every predetermined cam angle (for example, every 1°) as the intake cam shaft 6 is rotated. The crank shaft 9 is also provided with a crank angle sensor 29 which is similar in structure to the cam angle sensor 28. Specifically, the crank angle sensor 29 outputs a pulsed CRK signal to the ECU 2 every predetermined crank angle (for example, 1°) as the crank shaft 9 is rotated. The ECU 2 calculates (detects) the actual cam phase CAIN from the CRK signal and CAM signal (hereinafter, the cam phase actually detected in this manner is conveniently called the "actual cam phase"). The ECU 2 also calculates an engine rotational speed NE based on the CRK signal.

The engine 3 is also provided with a throttle valve 31 in an intake pipe 30, and an injector 32 and an intake pipe inner pressure sensor 33 based on a semiconductor pressure sensor or the like, attached at locations of the intake pipe 30 downstream of the throttle valve 31. A fuel injection time (injected fuel amount) TOUT of the injector 32 is controlled by a driving signal from the ECU 2. The intake pipe inner pressure sensor 33 detects an absolute pressure (absolute intake pipe inner pressure) PBA in the intake pipe 30, and sends a signal indicative of the detected pressure PBA to the ECU 2. An engine water temperature sensor 34 comprised of a thermistor or the like is also attached to the body of the engine 3. The engine water temperature sensor 34 detects an engine water temperature TW, which is the temperature of cooling water circulating within a cylinder block of the engine 3, and sends a signal indicative of the detected engine water temperature TW to the ECU 2. The ECU 2 is further supplied with a signal indicative of a detected oil temperature TOIL of the working oil of the VTC 1 from an oil temperature sensor 35 (oil temperature parameter detecting means), and with a signal indicative of a detected voltage of the battery (battery voltage) VB for driving the oil pressure control valve 10 from a battery voltage sensor 36, respectively.

In this embodiment, the ECU 2, which constitutes fault determining means, correcting means, storing means and normality determining means, is based on a microcomputer which comprises an I/O interface, a CPU, a RAM including a backup RAM, a ROM, and the like. Detection signals from a variety of the aforementioned sensors are inputted to the CPU after they are A/D converted and reshaped in the I/O interface.

The CPU, following a control program stored in the ROM, sets a target cam phase CAINCMD and feeds back a detected actual cam phase CAIN to control the same to reach the target cam phase CAINCMD in accordance with the detected absolute intake pipe inner pressure PBA, engine rotational speed NE and the like. Specifically, the CPU is responsive to a difference between the target cam phase CAINCMD and the actual cam phase CAIN to calculate the duty ratio DOUTVT for the oil pressure control valve 10 such that the difference is reduced to zero, and outputs a duty control signal based on the result to the duty solenoid 15 of the oil pressure control valve 10 to control the cam phase CAIN in feedback. The CPU further executes the fault determination processing for the VTC 1 in the following manner.

Figure 3:
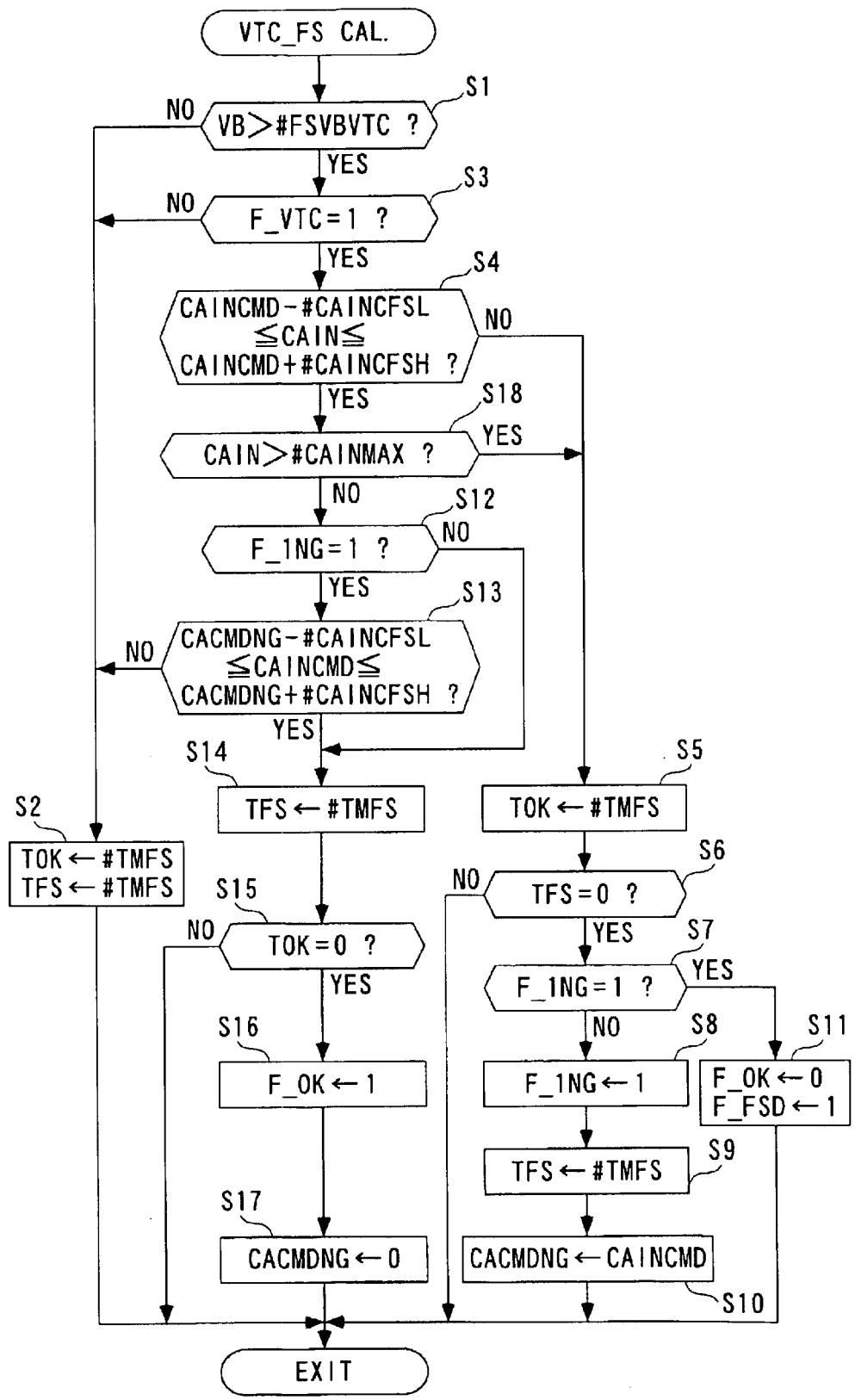
FIG. 3 is a flow chart illustrating a routine for determining a fault in the variable valve timing mechanism.

FIG. 3 is a flowchart illustrating a routine of the fault determination processing for the VTC 1. In the following description, fixed data stored in the ROM, among data used in the processing, is identified by a mark "#" attached at the beginning of the label to distinguish them from other data.

First, at step 1 (abbreviated as "S1" in the figure. The same is applied in the following), it is determined whether or not the battery voltage VB is higher than a predetermined value #FSVBVTC associated therewith. If the answer to step 1 is NO, i.e., VB≦#FSVBVTC, the processing proceeds to step 2, on the assumption that the voltage of the battery for driving the oil pressure control valve 10 is not sufficient so that the determination cannot be appropriately made, where a normality determination retard timer TOC and a fault determination retard timer TFS, both later described, are set to a predetermined time #TMFS (for example, 15 seconds), respectively, followed by termination of the routine. The normality and fault determination retard timers TOK, TFS are also set to the predetermined time #TMFS when an ignition switch is turned on upon starting the engine 3.

On the other hand, if the answer to step 1 is YES, i.e., VB>#FSVBVTC, it is determined whether or not a VTC operation flag F_VTC is "1" (step 3). If the answer to step 3 is NO, i.e., when the VTC 1 is inoperative with F_VTC=0, the processing proceeds to the aforementioned step 2, on the assumption that the fault determination cannot be made. On the other hand, if the answer to step 3 is YES, i.e., when the VTC 1 is in operation, it is determined whether or not the actual cam phase CAIN at that time is equal to or more than a difference between the target cam phase CAINSMD and the retard predetermined value #CAINCFSL (=CAINSMD−#CAINCFSL), and equal to or less than a sum of the target cam phase CAINCMD and the advance predetermined value #CAINCFSH (=CAINCMD+#CAINCFSH) (step 4). In other words, this determination is made to see whether or not a cam phase difference between the target cam phase CAINCMD and the actual cam phase CAIN (hereinafter simply called the "cam phase difference") is within a predetermined range defined by the retard and advance predetermined values #CAINCFSL, #CAINCFSH (see FIG. 5).

Figure 4:
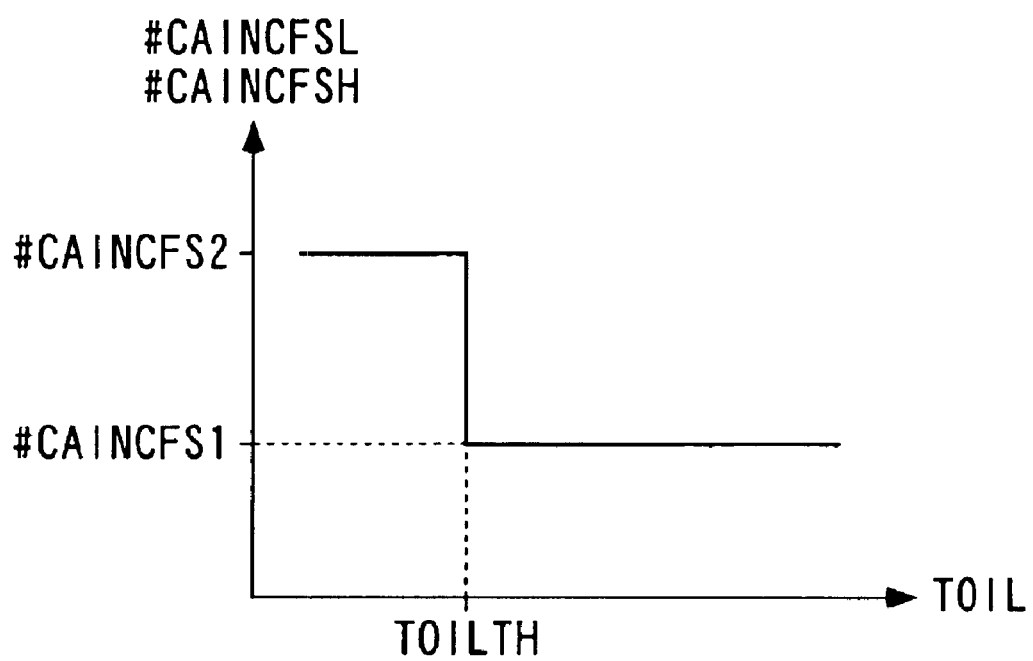
FIG. 4 shows an exemplary graph for setting a retard and an advance predetermined value #CAINCFSL, #CAINCFSH.

These retard and advance predetermined values #CAINCFSL, #CAINCFSH are set in accordance with the oil temperature TOIL based on an exemplary table shown in FIG. 4. As shown in the table, the predetermined values #CAINCFSL, #CAINCFSH are both set to the same value. The retard and advance predetermined values #CAINCFSL, #CAINCFSH are set to a first predetermined value #CAINCFS1 for high temperatures (for example, 5°) when the oil temperature TOIL is equal to or higher than a threshold value TOILTH (for example, −0° C.) associated therewith, and set to a second predetermined value #CAINCFS2 for low temperatures (for example, 10°) higher than the first predetermined value #CAINCFS1 when the oil temperature TOIL is lower than TOILTH, respectively. In the foregoing manner, at low oil temperatures where the oil temperature TOIL is lower than the threshold value TOILTH, the retard and advance predetermined values #CAINCFSL, #CAINCFSH are set to the larger predetermined value #CAINCFS2 to correct a predetermined range of the cam phase difference defined thereby to increase.

Turning back to FIG. 3, if the answer to the aforementioned step 4 is NO, i.e., when the cam phase difference is out of the predetermined range, the normality determination retard timer TOK is set to the predetermined time #TMFS (step 5), and then it is determined whether or not the fault determination retard timer TFS presents a timer value equal to zero (step 6). If the answer to step 6 is NO, the routine is terminated without further processing. On the other hand, if the answer to step 6 is YES, i.e., when the cam phase difference remains out of the predetermined range for the predetermined time #TMFS, it is determined whether or not a preliminary fault determination flag F_1NG is "1" (step 7).

If the answer to step 7 is NO, i.e., when the VTC1 has not been determined as faulty until that time and is determined as faulty for the first time, the preliminary fault determination flag F-1NG is set to "1" to indicate to that effect (step 8). The preliminary fault determination flag F_1NG is stored in the backup RAM, so that it is held until a next operation even if the engine 3 is stopped. Next, the fault determination retard timer TFS is set to the predetermined time #TMFS (step 9), and the target cam phase CAINCMD at that time is set as a preliminary fault determination target cam phase CACMDNG (step 10), followed by termination of this routine.

On the other hand, if the answer to the aforementioned step 7 is YES, i.e., when the preliminary fault determination flag F_1NG is "1," specifically, when the cam phase difference again goes out of the predetermined range after the preliminary fault determination and remains in this state for the predetermined time #TMFS, a normality flag F_OK is set to "0" and a fault flag F_FSD is set to "1" to indicate that the VTC1 is definitely faulty (step 11), followed by termination of the routine. In the foregoing manner, the faulty VTC 1 is definitely determined on condition that confirmation is made twice that the cam phase difference remains out of the predetermined range for the predetermined time. When the fault is definitely determined, an alarm light (not shown), for example, may be turned on to notify to that effect.

Figure 8:
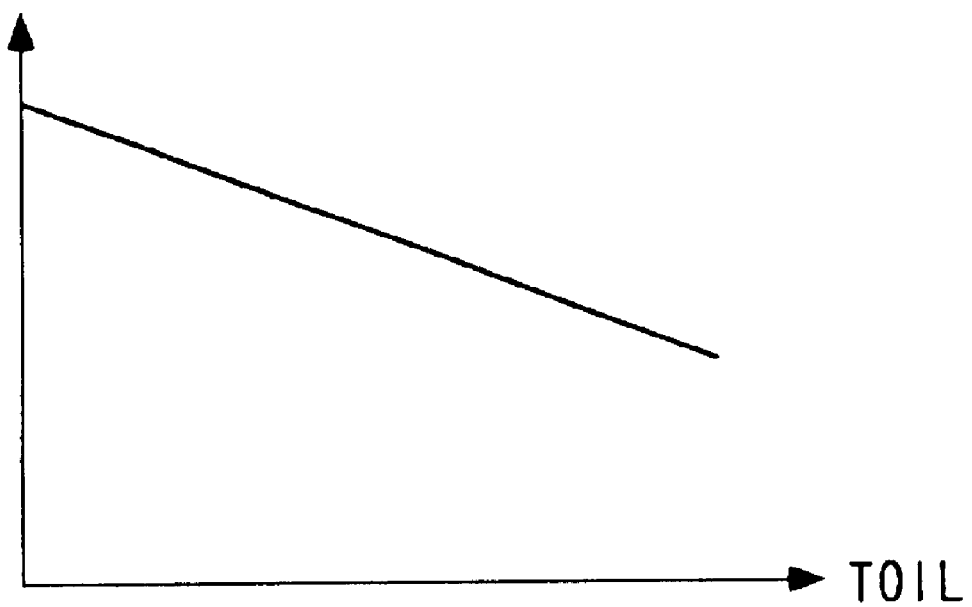
FIG. 8 shows an exemplary graph for setting an upper limit value #CAINMAX.

On the other hand, if the answer to the aforementioned step 4 is YES, i.e., when the cam phase difference is within the predetermined range, it is determined whether or not the actual cam phase CAIN is larger than a predetermined upper limit value #CAINMAX which is set therefor (step 18). The upper limit value #CAINMAX is set in accordance with the oil temperature TOIL based on a table shown in FIG. 8 as an example. As shown, in this table, the upper limit value #CAINMAX is linearly set larger as the oil temperature TOIL is lower. As described above, since the VTC 1 is more likely to be instable in operation when the oil temperature TOIL is low, the upper limit value #CAINMAX may be set as shown to appropriately determine whether the VTC 1 is faulty while ensuring to avoid an erroneous determination at low oil temperatures where the VTC 1 may present an instable operation.

If the answer to step 18 is NO, establishing CAIN>#CAINMAX, the routine proceeds to the aforementioned step 5 onward, on the assumption that the actual cam phase indicates an abnormally large value.

On the other hand, if the answer to step 18 is YES, establishing CAIN≦#CAINMAX, it is determined, like step 7, whether or not the preliminary fault determination flag F_1NG is "1" (step 12). If the answer to step 12 is NO, i.e., when no preliminary fault determination has been made, the fault determination retard timer TFS is set to the predetermined time #TMFS (step 14), and then it is determined whether or not the normality determination retard timer TOK presents a timer value equal to zero (step 15). If the answer to step 15 is NO, the routine is terminated without further processing. On the other hand, if the answer to step 15 is YES, i.e., when the cam phase difference remains within the predetermined range for the predetermined time #TMFS, the normality flag F_OK is set to "1" to indicate that the VTC 1 is normal (step 16). Next, the preliminary fault determination target cam phase CACMDNG is set to "0" (step 17), followed by termination of the routine.

On the other hand, if the answer to the aforementioned step 12 is YES, i.e., when the preliminary fault determination flag F_1NG is "1," i.e., when the cam phase difference falls within the predetermined range after the preliminary fault determination, it is determined whether the target cam phase CAINCMD at that time is equal to or more than a difference between the preliminary fault determination target cam phase CACMDNG and the retard predetermined value #CAINCFSL (=CACMDNG−#CAINCFSL), and is equal to or less than a sum of the CACMDNG value and the advance predetermined value #CAINCFSH (=CACMDNG+#CAINCFSH) (step 13). In other words, this determination is made to see whether or not the difference between the target cam phase CAINCMD and the preliminary fault determination target cam phase CACMDNG (hereinafter simply called the "target cam phase difference") at that time is within a predetermined range defined by the retard and advance predetermined values #CAINCFSL, #CAINCFSH.

If the answer to step 13 is YES, i.e., when the target cam phase CAINCMD, which is set when the cam phase difference falls within the predetermined range after the preliminary fault determination, is close to the preliminary fault determination target cam phase CACMDNG, the routine proceeds to the aforementioned step 14 onward, determining that the VTC 1 is likely to have returned to a normal state. Thus, when the cam phase difference remains within the predetermined range for the predetermined time TMFS, the VTC 1 is determined to be normal (step 16).

On the other hand, if the answer to step 13 is NO, i.e., when the target cam phase CAINCMD, which is set when the cam phase difference falls within the predetermined range after the preliminary fault determination, is far from the preliminary fault determination target cam phase CACMDNG, the determination of the VTC 1 as normal is suspended, on the assumption that the cam phase difference has fallen within the predetermined range, for example, because the target cam phase CAINCMD is close to a frozen cam phase. Then, after the aforementioned step 2 is executed, the routine is terminated.

Figure 5A:
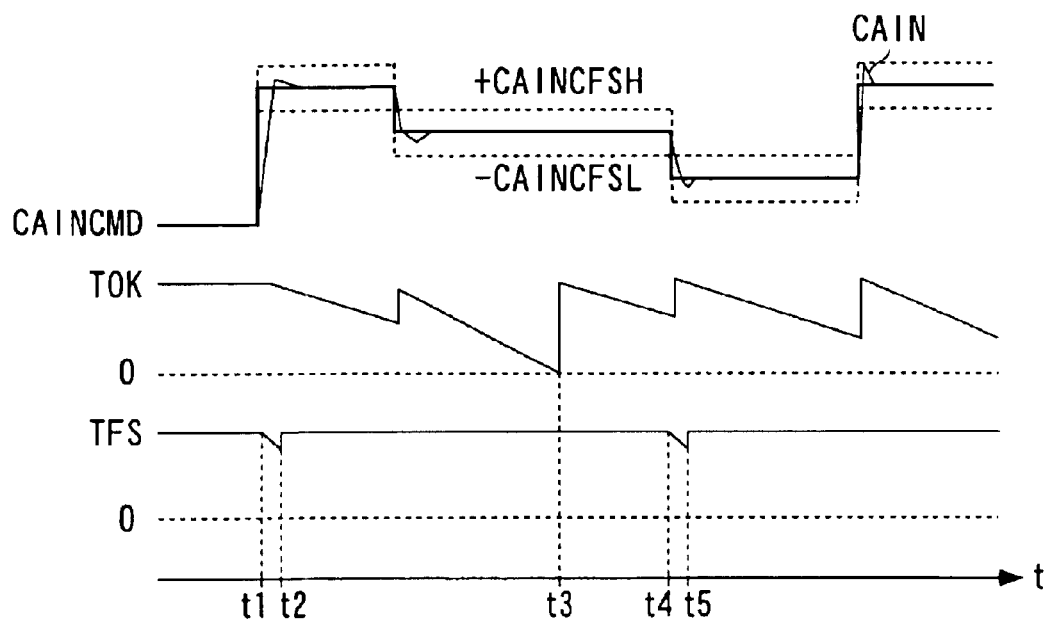
FIGS. 5A and 5B are timing charts showing exemplary operations performed along the flow chart of FIG. 3 when the variable valve timing mechanism is normal (A), and when it is faulty (B)
Figure 5B:
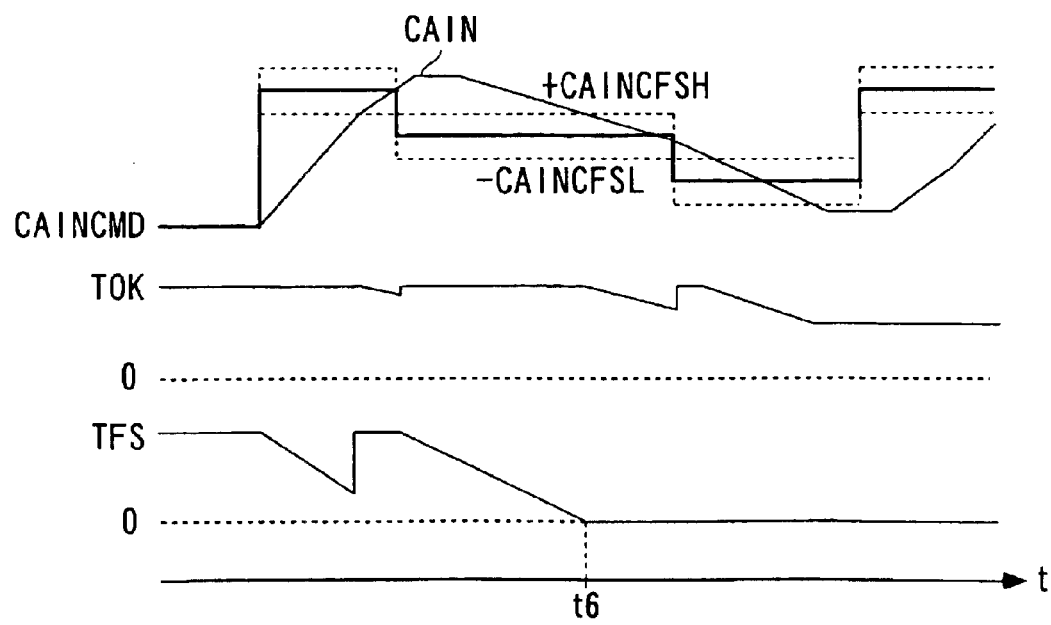

FIGS. 5A, 5B show exemplary operations which are provided by the fault determination processing. In an example of FIG. 5A which shows that the VTC 1 is normal, the actual cam phase CAIN tightly follows the target cam phase CAINCMD, and remains within the predetermined range defined by the retard and advance predetermined values #CAINCFSL, #CAINCFSH (YES at step 4 in FIG. 3) except for some sections (t1–t2, t4–t5) immediately after the setting is changed. Then, this state is measured by the normality determination retard timer TOK, and the VTC 1 is determined as normal (step 16) when the timer TOK presents the timer value equal to zero at the time (t3) at which the state has lasted for the predetermined time #TMFS (YES at step 15).

On the other hand, in an example of FIG. 5B which shows that the VTC 1 is faulty, the actual cam phase CAIN does not tightly follow the target cam phase CAINCMD, so that the actual cam phase CAIN is more likely to go out of the predetermined range. This state is measured by the fault determination retard timer TFS, and the VTC 1 is determined as faulty at the time the state has lasted for the predetermined time #TMFS (t6) at which the timer TFS presents the timer value equal to zero (YES at step 6). In this event, as described above, the fault is preliminarily determined at the first time (NO at step 7), and the fault is definitely determined at the second time (YES at step 7).

Thus, according to the foregoing embodiment, at low oil temperatures at which a detected oil temperature TOIL is lower than the threshold value TOILTH, the retard and advance predetermined values #CAINCFSL, #CAINCFSH are set to the larger second predetermined value #CAINCFS2 to correct the predetermined range for the cam phase difference for the fault determination so that the predetermined range becomes wider, thereby alleviating the condition for the fault determination. It is therefore possible to appropriately determine a fault and meanwhile prevent an erroneous determination, while reflecting a difference in the responsibility of the VCT 1 depending on the oil temperature TOIL. Also, unlike the prior art, the result of fault determination can be provided at an earlier time since the fault determination is not disabled at low oil temperatures, or the determination time is not extended.

Also, since the faulty VTC 1 is definitely determined on condition that the cam phase difference out of the predetermined range is confirmed twice for the predetermined time #TMFS, it is possible to avoid an erroneous determination which could be made when the cam phase difference temporarily goes out of the predetermined range, even though no fault is actually occurring, thereby appropriately carrying out the fault determination. Further, since the VTC 1 is determined as normal only when the preliminary fault determination target cam phase CACMDNG is relatively close to the target cam phase CAINCMD when the cam phase difference subsequently falls under the predetermined range, and a determination of the VTC 1 as normal is suspended when CACMDNG is far away from CAINCMD, so that the determination of the normal VTC 1 can be appropriately made while preventing an erroneous determination without fail when the VTC 1 is frozen.

FIG. 6 shows an exemplary graph, different from that of FIG. 4, for setting the retard and advance predetermined values #CAINCFSL, #CAINCFSH. In this table, the predetermined values #CAINCFSL, #CAINCFSH are both set at the same value, and are linearly set larger as the oil temperature TOIL is lower. Likewise, the predetermined range for the cam phase difference is linearly set to become wider as the oil temperature TOIL is lower. Since the responsibility of the VTC 1 driven by a working oil is generally degraded as the oil temperature TOIL is lower, this table allows the predetermined range for the cain phase difference to be more finely and appropriately set in accordance with the oil temperature TOIL to fit to the responsibility of the VTC 1, thereby making it possible to improve the accuracy of the fault determination.

FIG. 7 is an exemplary graph, different from those of FIGS. 4 and 6, for setting the retard and advance predetermined values #CAINCFSL, #CAINCFSH. in this table, the predetermined values #CAINCFSL, #CAINCFSH are both set to the same value. Specifically, as the oil temperature TOIL is lower, the predetermined values #CAINCFSL, #CAINCFSH are set to a value which is increased at a higher rate for a fall in the oil temperature TOIL. Similarly, the predetermined range for the cam phase difference is set to be larger at a higher rate for a fall in the oil temperature TOIL, as the oil temperature TOIL is lower. Since the responsibility of the VTC 1 is generally degraded at a higher rate as the oil temperature TOIL is lower, this table allows the predetermined range for the cam phase difference to be more appropriately set in accordance with the oil temperature TOIL to fit to the responsibility of the VTC 1, thereby making it possible to further improve the accuracy of the fault determination.

It should be understood that the present invention is not limited to the foregoing embodiment but may be practiced in a variety of implementations. For example, while the foregoing embodiment detects the oil temperature TOIL by the oil temperature sensor 35 as a parameter indicative of the temperature of the working oil of the VTC 1, this parameter is only required to reflect the oil temperature, so that the oil temperature may be estimated, for example, from the engine water temperature TW detected by the engine water temperature sensor 34.

Also, in the foregoing embodiment, the retard and advance predetermined values #CAINCFSL, #CAINCFSH are set to the same value to define the predetermined range for the cam phase difference symmetrically centered at the target cam phase CAINCMD. Alternatively, #CAINCFSL, #CAINCFSH may be set to different values to shift the predetermined range toward the retard region or the advance region, thereby defining an asymmetric range. With such an asymmetric predetermined range, for example, the advance predetermined value #CAINCFSH is set to a larger value than the retard predetermined value #CAINCFSL when the actual cam phase CAIN is controlled in the increasing (advance) direction, while the retard predetermined value #CAINCFSH is set to a larger value than the advance predetermined value #CAINCFSH when the actual cam phase CAIN is controlled in the decreasing (retard) direction, thereby making it possible to more appropriately determine a fault without erroneously determining a temporary overshoot as a fault.

Further, while the foregoing embodiment has shown a variable valve timing mechanism with a variable intake cam phase to which the present invention is applied, it goes without saying that the present invention can be applied to a variable valve timing mechanism which varies an exhaust cam phase instead of or in addition to the intake cam phase.

As described above, the fault determining apparatus for a variable valve timing mechanism according to the present invention can advantageously determine a fault at an earlier time in a high accuracy while preventing an erroneous determination even at low oil temperatures.

What is claimed is:

1. A fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of said at least one of said intake cam and said exhaust cam in a feedback manner to reach a target cam phase, said fault determining apparatus comprising:

fault determining means for determining that said variable valve timing mechanism is faulty when a cam phase difference between said target cam phase and said actual cam phase is not within a first predetermined range;

oil temperature parameter detecting means for detecting an oil temperature parameter indicative of a temperature of said working oil; and correcting means for broadening said first predetermined range when said temperature of said working oil is low, wherein said fault determining means is configured to preliminarily determine that said variable valve timing mechanism is faulty when said cam phase difference is not within said first predetermined range, and to definitely determine that said variable valve timing mechanism is faulty when said cam phase difference again goes out of said first predetermined range, and wherein said fault determining apparatus further comprises:

a storing means for storing said target cam phase when said fault determining means preliminarily determines a fault as a preliminary fault determination target cam phase; and a normality determining means for determining that said variable valve timing mechanism is normal when a difference between said target cam phase which is set when said cam phase difference falls under said first predetermined range after said preliminary determination of the fault and said stored preliminary fault determination target cam phase is within a second predetermined range, and for suspending a determination that said variable valve timing mechanism is normal when said cam phase difference is not within said second predetermined range.

2. A fault determining apparatus for a variable valve timing mechanism according to claim 1, wherein said correcting means linearly broadens said first predetermined range as said temperature of said working oil is lower.

3. A fault determining apparatus for a variable valve timing mechanism according to claim 1, wherein said correcting means non-linearly and largely broadens said first predetermined range as said temperature of said working oil is lower.

4. A fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of said at least one of said intake cam and said exhaust cam in a feedback manner to reach a target cam phase, said fault determining apparatus comprising:

a fault determining module for determining that said variable valve timing mechanism is faulty when a cam phase difference between said target cam phase and said actual cam phase is not within a first predetermined range;

an oil temperature parameter detecting module for detecting an oil temperature parameter indicative of a temperature of said working oil; and a correcting module for broadening said first predetermined range when said temperature of said working oil is low, wherein said fault determining module is configured to preliminarily determine that said variable valve timing mechanism is faulty when said cam phase difference is not within said first predetermined range, and to definitely determine that said variable valve timing mechanism is faulty when said cam phase difference again goes out of said first predetermined range, and wherein said fault determining apparatus further comprises:

a storing module for storing said target cam phase when said fault determining module preliminarily determines a fault as a preliminary fault determination target cam phase; and a normality determining module for determining that said variable valve timing mechanism is normal when a difference between said target cam phase which is set when said cam phase difference falls under said first predetermined range after said preliminary determination of the fault and said stored preliminary fault determination target cam phase is within a second predetermined range, and for suspending a determination that said variable valve timing mechanism is normal when said cam phase difference is not within said second predetermined range.

5. A fault determining apparatus for a variable valve timing mechanism according to claim 4, wherein said correcting module linearly broadens said first predetermined range as said temperature of said working oil is lower.

6. A fault determining apparatus for a variable valve timing mechanism according to claim 4, wherein said correcting module non-linearly and largely broadens said first predetermined range as said temperature of said working oil is lower.

7. A fault determining method for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of said at least one of said intake cam and said exhaust cam in a feedback manner to reach a target cam phase, said fault determining method comprising the steps of:

determining that said variable valve timing mechanism is faulty when a cam phase difference between said target cam phase and said actual cam phase is not within a first predetermined range;

detecting an oil temperature parameter indicative of a temperature of said working oil; and broadening said first predetermined range when said temperature of said working oil is low, wherein said step of determining that said variable valve timing mechanism is faulty includes preliminarily determining that said variable valve timing mechanism is faulty when said cam phase difference is not within said first predetermined range, and definitely determining that said variable valve timing mechanism is faulty when said cam phase difference again goes out of said predetermined range, and wherein said fault determining method further comprises the steps of:

storing said target cam phase when preliminarily determining a fault as a preliminary fault determination target cam phase; and determining that said variable valve timing mechanism is normal when a difference between said target cam phase which is set when said cam phase difference falls under said first predetermined range after said preliminary determination of the fault and said stored preliminary fault determination target cam phase is within a second predetermined range, and suspending a determination that said variable valve timing mechanism is normal when said cam phase difference is not within said second predetermined range.

8. A fault determining method for a variable valve timing mechanism according to claim 7, wherein said first predetermined range is linearly broadened as said temperature of said working oil is lower.

9. A fault determining method for a variable valve timing mechanism according to claim 7, wherein said first predetermined range is non-linearly and largely broadened as said temperature of said working oil is lower.

10. An engine control unit for fault determination of a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of said at least one of said intake cam and said exhaust cam in a feedback manner to reach a target cam phase, said engine control unit comprising:

a fault determining means for determining that said variable valve timing mechanism is faulty when a cam phase difference between said target cam phase and said actual cam phase is not within a first predetermined range;

an oil temperature parameter detecting means for detecting an oil temperature parameter indicative of a temperature of said working oil;

a correcting means for making said first predetermined range broadened in an increasing direction when said temperature of said working oil is low; and a control means including a control program for operating a computer controlling the engine control unit, wherein said control program causes said computer to preliminarily determine that said variable valve timing mechanism is faulty when said cam phase difference is not within said first predetermined range, and definitely determine that said variable valve timing mechanism is faulty when said cam phase difference again goes out of said first predetermined range, and wherein said control program further causes said computer to store said target cam phase when preliminarily determining a fault as a preliminary fault determination target cam phase; determine that said variable valve timing mechanism is normal when a difference between said target cam phase which is set when said cam phase difference falls under said first predetermined range after said preliminary determination of the fault and said stored preliminary fault determination target cam phase is within a second predetermined range; and suspend a determination that said variable valve timing mechanism is normal when said cam phase difference is not within said second predetermined range.

11. An engine control unit according to claim 10, wherein said control program causes said computer to linearly broaden said first predetermined range as said temperature of said working oil is lower.

12. An engine control unit according to claim 10, wherein said control program causes said computer to non-linearly and largely broaden said first predetermined range as said temperature of said working oil is lower.

13. An fault determining apparatus for a variable valve timing mechanism driven by an oil pressure of a working oil to change a phase of at least one of an intake cam and an exhaust cam with respect to a crank shaft of an internal combustion engine to change an opening/closing timing of at least one of an intake valve and an exhaust valve, and to control an actual cam phase of said at least one of said intake cam and said exhaust cam in a feedback manner to reach a target cam phase, said fault determining apparatus comprising:

a predetermined range setting means for setting a predetermined range asymmetrically centered at said target cam phase;

a fault determining means for determining that said variable valve timing mechanism is faulty when a cam phase difference between said target cam phase and said actual cam phase is not within the predetermined range;

an oil temperature parameter detecting means for detecting an oil temperature parameter indicative of a temperature of said working oil; and a correcting means for broadening said predetermined range when said temperature of said working oil is low.

\* \* \* \* \*